US010927953B2

(12) United States Patent
Svrcek (10) Patent No.: US 10,927,953 B2
(45) Date of Patent: Feb. 23, 2021

(54) PISTON SEAL WITH SOLID LUBRICANT APPLICATOR

(71) Applicant: EtaGen, Inc., Menlo Park, CA (US)

(72) Inventor: Matt Svrcek, Redwood City, CA (US)

(73) Assignee: Mainspring Energy, Inc., Menlo Park, CA (US)

(*) Notice: Subject to any disclaimer, the term of this patent is extended or adjusted under 35 U.S.C. 154(b) by 219 days.

(21) Appl. No.: 16/100,124

(22) Filed: Aug. 9, 2018

(65) Prior Publication Data
US 2019/0049011 A1    Feb. 14, 2019

Related U.S. Application Data (60) Provisional application No. 62/543,305, filed on Aug. 9, 2017.

(51) Int. Cl.
| | |
|---|---|
| *F16J 9/20* | (2006.01) |
| *F16J 1/08* | (2006.01) |
| *F02F 5/00* | (2006.01) |
| *F16J 9/26* | (2006.01) |

(52) U.S. Cl.
CPC ............. *F16J 9/20* (2013.01); *F02F 5/00* (2013.01); *F16J 1/08* (2013.01); *F16J 9/26* (2013.01)

(58) Field of Classification Search
CPC ......... F16J 9/20; F16J 9/26; F16J 1/08; F02F 5/00
See application file for complete search history.

(56) References Cited

U.S. PATENT DOCUMENTS

| | | | | |
|---|---|---|---|---|
| 3,675,738 | A | * | 7/1972 | Bush ................ F01M 11/00 184/18 |
| 4,109,921 | A | * | 8/1978 | Urbaschek ............. F16J 15/32 277/452 |
| 4,185,842 | A | | 1/1980 | Magara |
| 4,455,974 | A | | 6/1984 | Shapiro et al. |
| 5,085,185 | A | * | 2/1992 | Heshmat ............. C10M 103/00 123/193.6 |

(Continued)

FOREIGN PATENT DOCUMENTS

JP        H0278752 A    3/1990

OTHER PUBLICATIONS

International Search Report and Written Opinion of the International Searching Authority for application No. PCT/US2018/046104, dated Nov. 2, 2018.

*Primary Examiner* — Gilbert Y Lee
(74) *Attorney, Agent, or Firm* — Haley Guiliano LLP; Alexander Shvarts; Andrew C. Lee (57) ABSTRACT

A ringset is configured to be arranged on a piston for sealing a gas in a high-pressure region of a cylinder in the absence of oil or other liquid lubricant. The ringset includes one or more rings made from a high-strength material as a sealing element. The ringset also includes a solid lubricant applicator configured to provide lubrication between the one or more rings and a bore of the cylinder. For example, the ring can support pressure loads from high-pressure gas without breaking, while the applicator need not act as a seal. As the piston reciprocates in the bore, the applicator slides against the bore and applies solid lubricant material to the bore, resulting in a solid lubricant film on the bore against which the sealing element may slide. The applicator includes a material such as a graphite, a polymer, or other suitable solid lubricant.

27 Claims, 7 Drawing Sheets

(56) References Cited

U.S. PATENT DOCUMENTS

| | | | |
|---|---|---|---|
| 5,598,763 | A | 2/1997 | Rao et al. |
| 6,322,080 | B1 | 11/2001 | Feistel |
| 6,457,722 | B1 | 10/2002 | Feistel |
| 8,807,571 | B2 | 8/2014 | Chalk et al. |
| 2003/0006562 | A1 | 1/2003 | Feistel |
| 2005/0279802 | A1* | 12/2005 | Moeller .................... B25C 1/08 227/130 |

\* cited by examiner

PISTON SEAL WITH SOLID LUBRICANT APPLICATOR

The present disclosure is directed towards a sealing ringset and, more particularly, the present disclosure is directed towards a sealing ringset having a ring and a solid lubricant applicator. This application claims the benefit of U.S. Provisional Patent Application No. 62/543,305 filed Aug. 9, 2017, the disclosure of which is hereby incorporated by reference herein in its entirety.

BACKGROUND

Seals for piston-cylinder devices separate high-pressure gas in the cylinder at one end of the piston from lower pressure gas at the other end of the piston. Typically, this seal consists of a ring, or rings, that sit in circumferential grooves in the outer piston surface. As the piston and seal reciprocate in the cylinder, the outer surface of the seal element may come in sliding contact with the inner surface of the cylinder. Friction between the seal and the cylinder wall occurs at this sliding interface and can result in wear-related failures such as, for example galling, scuffing, or seizing between the seal and cylinder. A widespread solution to this problem is to apply a film of lubricating fluid such as oil to the interface between the seal and the cylinder.

The use of a self-lubricating material for the seal can reduce scuffing or galling failures but introduces at least two significant problems. First, self-lubricating materials generally have low inherent material strength and are prone to failures by breakage when subjected to a high-pressure differential. Second, the seal material generally wears down quickly, resulting in gaps opening thus allowing leakage of the gas being sealed. The wear may further result in large amounts of crevice volume in the piston groove as the seal moves radially outward to maintain a seal as seal material is removed. The relatively high rate of wear is inherent and fundamental to use of the self-lubricating material because material must be removed from the seal element to access the lubricating properties.

SUMMARY

In some embodiments, the present disclosure is directed to a sealing ringset configured to seal against a bore of a cylinder without oil. The sealing ringset includes at least one sealing ring and at least one applicator. In some embodiments, the at least one sealing ring includes metal configured to be arranged on a piston to seal against the bore. The applicator includes a solid lubricant and is configured to be arranged on the piston. The applicator provides lubrication between the at least one sealing ring and the bore.

In some embodiments, the at least one sealing ring and the applicator are configured to be arranged together in a circumferential groove of the piston.

In some embodiments, the at least one sealing ring and the applicator are configured to be arranged in respective circumferential grooves of the piston.

In some embodiments, the at least one sealing ring is axially rearward of the applicator.

In some embodiments, the at least one sealing ring is axially forward of the applicator.

In some embodiments, the applicator is not configured to act as a seal.

In some embodiments, the applicator comprises an oxidation inhibitor.

In some embodiments, the applicator is configured to provide lubrication between the at least one sealing ring and the bore by depositing a layer of the solid lubricant on the bore.

In some embodiments, the sealing ringset includes a spring arranged radially inwards of the applicator and configured to apply a radially outward force on the applicator.

In some embodiments, the at least one sealing ring comprises a first sealing ring, and the sealing ringset includes a second sealing ring. The second sealing ring includes a solid lubricant and is configured to prevent the first sealing ring from contacting a ring groove.

In some embodiments, the present disclosure is directed to a piston assembly. The piston assembly includes a piston having at least one circumferential groove and a sealing ringset. The sealing ringset includes at least one sealing ring and an applicator. In some embodiments, the at least one sealing ring includes metal and is configured to be arranged in the at least one circumferential groove. The at least one sealing ring is also configured to seal against a bore without oil. The applicator includes a solid lubricant and is configured to be arranged in the at least one circumferential groove. The applicator is configured to provide lubrication between the at least one sealing ring and the bore. In some embodiments, the at least one circumferential groove consists of a single groove, and the at least one sealing ring and the applicator are configured to be arranged together in the single groove. In some embodiments, the at least one circumferential groove includes at least two grooves, and the at least one sealing ring and the applicator are configured to be arranged in respective circumferential grooves of the piston.

In some embodiments, the present disclosure is directed to a device including a cylinder, a piston, and a sealing ringset. The cylinder includes a bore. The piston includes at least one circumferential groove and is configured to move axially within the bore. The sealing ringset includes at least one sealing ring and an applicator. The at least one sealing ring includes metal and is configured to be arranged in the at least one circumferential groove. The at least one sealing ring is also configured to seal against the bore without oil. The applicator includes a solid lubricant and is configured to be arranged in the at least one circumferential groove. The applicator is configured to provide lubrication between the at least one sealing ring and the bore.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

In some embodiments, the present disclosure is directed to a sealing ringset configured for sealing a gas in a high-pressure region of a piston and cylinder device, more particularly in the absence of a liquid lubricant material (e.g., oil). In some embodiments, a metal, other high-strength material, or a combination of both is used as the seal element (e.g., a ring), with a separate solid-lubricant applicator arranged in a groove of the piston. By separating the sealing and lubricating functions, materials can be selected independently (e.g., and may be optimized for each particular function). For example, the sealing element is constructed of a high-strength material (e.g., a metal) and thus can support pressure loads from high-pressure gas without breaking. The sealing element can also be made of a relatively hard, wear-resistant material on its sliding surface (e.g., its radially outer surface configured to seal against a bore), thus minimizing, or otherwise reducing, the radial wear experienced by the sealing element. A separate solid-lubricant applicator is located on the piston and is configured to reduce scuffing and other friction-related failures that would occur with such a material of the sealing element in the absence of lubrication. For example, as the piston reciprocates in the bore, the solid-lubricant applicator slides against the cylinder bore and applies solid lubricant material to the bore by wearing against the bore. A solid lubricant film results on the bore, against which the sealing element may slide. The solid-lubricant applicator need not function as the sealing element, or otherwise provide any sealing functionality, and therefore gaps and volumes that open as a result of wear of the applicator do not necessarily result in increased leakage. Further, because the applicator is not required to perform the sealing function, the applicator is not required to withstand the same pressure and thermal loads as the sealing element, and therefore, in some circumstances, the material strength limitations inherent to the solid lubricant material does not impact the sealing function greatly, if at all.

The term "seal" as used herein, refers to the creation, maintenance, or both of a high-pressure region and a low-pressure region. For example, a seal may include a sealing ring assembly that is configured to reduce a leakage rate of gas from a high-pressure region to a low-pressure region, by limiting flow between a high-pressure boundary and a low-pressure boundary of the seal. Accordingly, a seal can be defined in terms of its constraints on a leakage rate. It will be understood that a seal, such as a sealing ring assembly, as described herein, may have any suitable corresponding leakage rate. For example, in some circumstances, a relatively worse seal may allow more leakage, but may be acceptable based on one or more relevant performance criterion. In a further example, a sealing ring assembly configured for high efficiency operation of a piston and cylinder device may have a relatively low leakage rate (e.g., be a more effective seal).

As used herein, a "ring segment" shall refer to a sealing element extending for an azimuthal angle greater than zero degrees, having a radially outer surface, and configured to seal at least along a portion of the radially outer surface against a bore. A ring segment may include end faces, if not azimuthally contiguous around the full bore.

As used herein, a "ring" shall refer to a sealing element including at least one ring segment, which may be, but need not be, azimuthally contiguous along a bore. For example, a ring may include one ring segment, in which case these terms overlap. In a further example, a ring may include four ring segments, in which case the ring refers to the collective of the four ring segments. A ring may include, but need not include, one or more interfaces between one or more ring segments. A "ring" shall also refer to a sealing element including at least one ring segment configured to seal against a land of a piston.

As used herein, a "sealing ringset," also referred to as a "ringset," shall refer to a collection of one or more rings and one or more applicators, configured to engage with a piston, move along a bore, and seal between a high-pressure region and a low-pressure region of the bore. A sealing ringset may include more than one ring, each configured to act as a seal. A sealing ringset may include one or more solid lubricants applicator configured to aid the one or more rings in sealing. In some embodiments, an applicator need not act as a seal, but is configured to enable one or more rings to act as a seal (e.g., by providing lubricant to prevent seizing). In some embodiments, an applicator may provide at least some sealing functionality.

Figure 1:
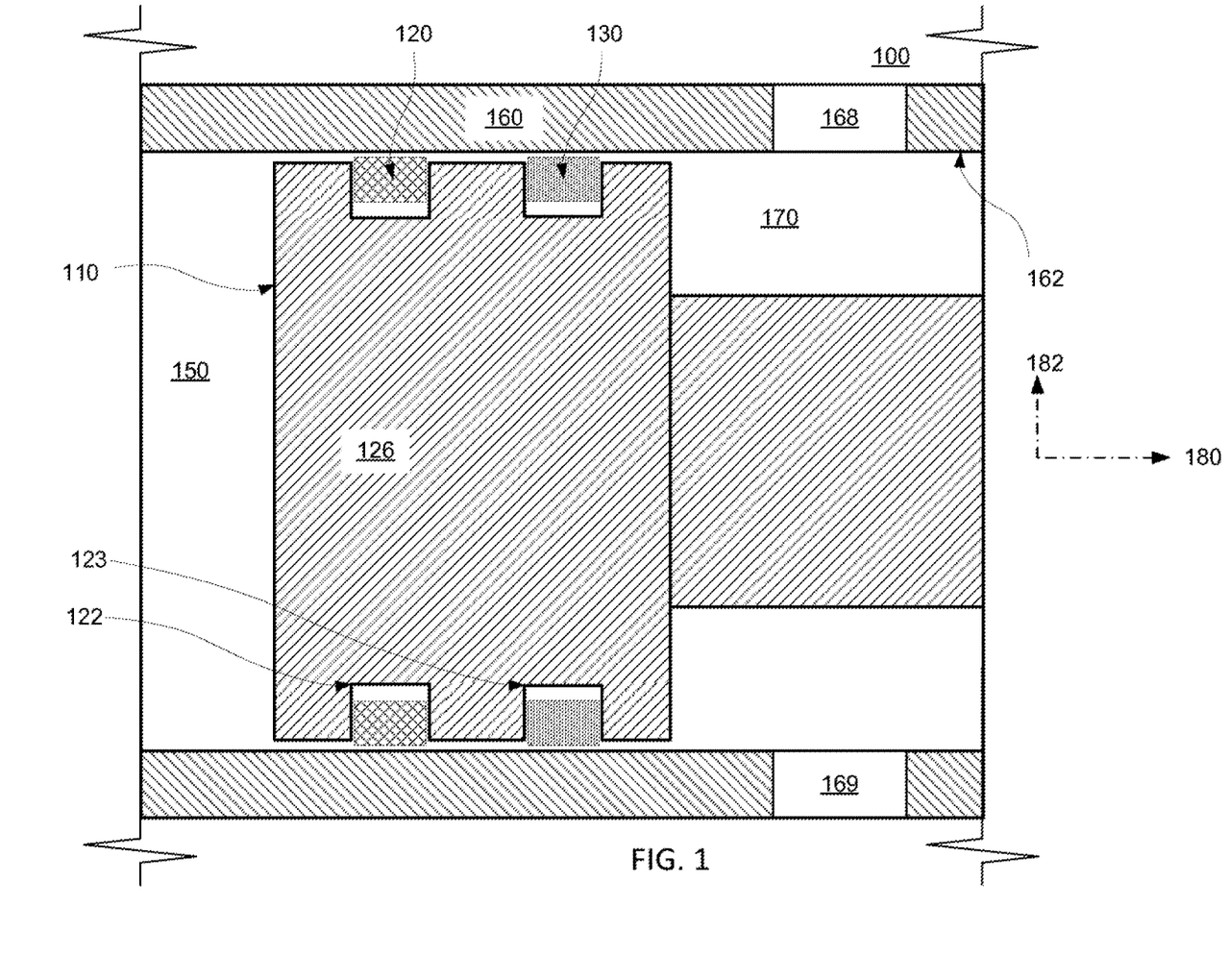
FIG. 1 shows a cross-sectional view of an illustrative piston assembly and cylinder, including a sealing ringset, in accordance with some embodiments of the present disclosure.

FIG. 1 shows a cross-sectional view of illustrative piston and cylinder assembly 100, including a sealing ringset, in accordance with some embodiments of the present disclosure. Cylinder 160 includes bore 162, which is the inner cylindrical surface in which piston assembly 110 travels (e.g., along axis 180). Piston assembly 110 includes piston 126, which includes grooves 122 and 123 (e.g., which may be annular), in which respective ring 120 and applicator 130 are configured to be arranged and translate with piston 126. Grooves 122 and 123 may be similar in shape, but need not be. Ring 120 and applicator 130 constitute an illustrative ringset. As piston assembly 110 translates along axis 180 (e.g., during an engine cycle), in cylinder 160, the gas pressure in high-pressure region 150 may change (e.g., high-pressure region 150 may be closed with a cylinder head or an opposing piston). For example, as piston assembly 110 moves to the left, as illustrated, the pressure in high pressure region 150 may increase. Low-pressure region 170, located to the rear (e.g., axis 180 is directed in the rearward direction) of the sealing ring assembly may be at a gas pressure below the pressure of high pressure region 150 for at least some, if not most, of a stroke or cycle of the piston assembly 110 in cylinder 160. The pressure ranges in high pressure region 150 and low-pressure region 170 may be any suitable ranges (e.g., sub-atmospheric pressure to well over 250 bar), and may depend on compression ratio, breathing details (e.g., boost pressure, pressure waves, port timing), losses, thermochemical properties of gases, and reaction thereof. Accordingly, the sealing ring assemblies described herein may be used to seal any suitable high-pressure region and low-pressure region, having any suitable pressure ranges. For example, in some embodiments, low-pressure region 170 may interact flow-wise with intake or exhaust ducting that is in communication with ports 168 or 169, and be maintained relatively near pressure in the ducting. In an illustrative example, low pressure region 170 may open to intake breathing ports, and may be at a pressure near to or strongly affected by (e.g., on average) an intake pressure (e.g., a boost pressure). In a further illustrative example, low pressure region 170 may open to exhaust breathing ports, and may be at a pressure near to or strongly affected by (e.g., on average) an exhaust pressure. In accordance with the present disclosure, sealing ring assemblies may be used to seal high-pressure regions from low-pressure regions for at least part of a stroke or cycle of a piston and cylinder assembly. It will be understood that the "front" of the ringset refers to the face or portion axially nearest high-pressure region 150, and the "rear" of the ringset refers to the face or portion axially nearest low-pressure region 170.

It will be understood that unless otherwise specified, all pressures referred to herein are in absolute units (e.g., not gage or relative).

In some embodiments, low-pressure region 170 may include, communicate gas pressure with, or otherwise be open to ports 168 and 169 for gas exchange. For example, ports 168 and 169 may be exhaust ports, intake ports, or both. Ports may be, but need not be, opened and closed using valves. For example, in some embodiments, ports 168 and 169 refer to openings coupled to a manifold or other flow plenum, without valves included (e.g., flow is control by covering and uncovering ports 168 and 169 by ring 120). In a further example, in some embodiments, ports 168 and 169 refer to openings coupled to a manifold or other flow plenum, with valves included to control flow profiles and timing. The term "valve" may refer to any actuated flow controller or other actuated mechanism for selectively passing matter through an opening, including but not limited to: ball valves, plug valves, butterfly valves, choke valves, check valves, gate valves, leaf valves, piston valves, poppet valves, rotary valves, slide valves, solenoid valves, 2-way valves, or 3-way valves. Valves may be actuated by any means, including but not limited to: mechanical, electrical, magnetic, camshaft-driven, hydraulic, or pneumatic means.

Ring 120 maintains contact with bore 162, or a layer of solid lubricant deposited thereon, to create the seal. Applicator 130 maintains contact with bore 162, or a layer deposited thereon, to further deposit solid lubricant onto the surface. The rate at which sliding wear removes material from the radially outer surface of applicator 130 is also a function of the resulting contact pressure (e.g., higher contact pressure increases the wear rate). For example, an increase in the contact pressure corresponds to an increase in wear rate and deposition rate. Deposited material from applicator 130 lubricates the interface between bore 162 and ring 120. Accordingly, piston and cylinder assembly 100 is configured to operate without liquid for lubrication (e.g., oil or synthetic oil). Components of a ringset that are referred to herein to be in contact with a bore may be in contact with a layer deposited on the bore, or both the layer and the bore. It will be understood that in the context of sealing, forces, and friction, the phrase "seal against a bore" also includes sealing against the layer deposited on the bore, or sealing against both the layer and the bore. To illustrate, the cylinder wall material (e.g., steel or other metal) need not actually be in contact with a ring or an applicator, but rather a surface layer of solid lubricant may be in contact with the ringset.

It will be understood that high-pressure and low-pressure may refer to transient pressure states of a piston and cylinder device. For example, referencing an engine cycle, the high-pressure boundary of a sealing ring assembly may have a pressure greater than a low-pressure boundary of the sealing ring assembly for most of the engine cycle (e.g., except during breathing or near-breathing portions of the cycle). Accordingly, high-pressure and low-pressure are relative and depend on the conditions of the gas being sealed. A sealing ring assembly may be used to seal a high pressure and a low-pressure region, each operating in any suitable pressure range. It will also be understood that a ringset may seal differently at different positions in a cycle. For example, a ringset may always seal a high-pressure region from a low-pressure region. In a further example, a ringset may seal a high-pressure region from a low-pressure region as long as the pressure in the high-pressure region is greater than the pressure in the low-pressure region.

In some embodiments, piston 126 may be an open-faced piston. For example, piston 126 may include (not shown) openings, cutouts, or other fluid paths from high pressure region 150 to groove 122, groove 123, or both. Accordingly, in some embodiments employing an open-faced piston, the inner radial surfaces (e.g., referencing radial direction 182 in FIG. 1) of ring 120, ring 130, or both, may be exposed to gas pressure of high-pressure region 150.

A ringset (e.g., ring 120 and applicator 130) may include any suitable geometry and include any suitable number of rings, number of applicators, and number of ring grooves. For example, the ringset of FIG. 1 includes a single ring (i.e., ring 120), a single applicator (i.e., applicator 130), arranged in respective grooves (i.e., respective grooves 122 and 123), in which ring 120 is arranged axially forward of applicator 130 on piston 126. A ringset may include one or more rings, having a rectangular cross-section, or any other suitable non-rectangular cross section, or combination thereof. A ringset may include one or more rings each having any suitable arrangement of splits, interfaces, overlapping segments, or other features. For example, a ring may be segmented, and may include more than one ring segment, which are configured to mate to one another, or themselves, at respective interfaces to form the seal.

An applicator (e.g., applicator 130 of FIG. 1) may be configured to apply any suitable solid lubricant material to a bore, in accordance with the present application. For example, an applicator may include graphite, impregnated graphite, an oxidation inhibitor, a polymer, hexagonal boron nitride, molybdenum disulfide, any other suitable material, or any combination thereof. For example, in the context of an internal combustion engine, the solid lubricant material may include graphite, including graphite materials that may be impregnated with a minority fraction of another material, such as an oxidation inhibitor (e.g., to prevent corrosion of a sealing ring, a bore of a cylinder, or both), a soft metal (e.g., Tin or Antimony), phenolics, or a polymer-resin. In a further example, in the context of lower-temperature applications such as compressors, the solid lubricant material may include a polymer, optionally with graphite embedded. In an illustrative example, applicator 130 may include graphite embedded in polytetrafluoroethylene (PTFE).

For example, as illustrated in FIG. 1, applicator 130 consists of a circumferential ring made from the solid lubricant material. An applicator may include one or more splits to allow the applicator to expand radially as it wears, thus maintaining sliding contact with the bore. In some embodiments, a radial spring element (not shown in FIG. 1) may be included and arranged radially inward of an applicator to apply a radially outward force on the applicator against the bore to ensure consistent and continued application of solid lubricant. As illustrated in FIG. 1, ring 120 is arranged such that the gas pressure drop axially from high-pressure region 150 to low-pressure region 170 of the piston occurs primarily across ring 120 axially, rather than applicator 130. Applicator 130 is arranged such that it does not need to function as a seal and does not need to experience the full pressure and temperature conditions of high-pressure region 150. Although not shown in FIG. 1, additional rings may be included on the piston downstream (i.e., rearward) of applicator 130. For example, a second ring (not shown in FIG. 1) may be included in a third groove (not shown in FIG. 1), downstream of applicator 130 (e.g., as illustratively shown in FIG. 8). Illustrated in FIGS. 4-11 are some examples of ringsets including multiple rings.

Ring 120 may include a ductile material having a large tensile strength such as, for example, a metal. For example, ring 120 may include steel, stainless steel, a copper alloy, a high-temperature alloy (e.g., Inconel or other nickel alloys), a composite of several materials, a composite of several structures of material, any other suitable material or materials, or any combination thereof. In some embodiments, ring 120 may include a coating for wear resistance such as, for example, a thermal spray coating, a physical vapor deposition coating, a plating (e.g., chrome plating), a diamond-like carbon (DLC) coating, a surface treatment (e.g., nitriding or heat treating), any other suitable surface treatment for wear resistance, or any combination thereof. In some embodiments, ring 120 may include a split, allowing it to expand radially outward to match bore 162 and maintain a tight seal. Ring 120 is configured to slide on a film of solid lubricant deposited on bore 162 by applicator 130.

Figure 2:
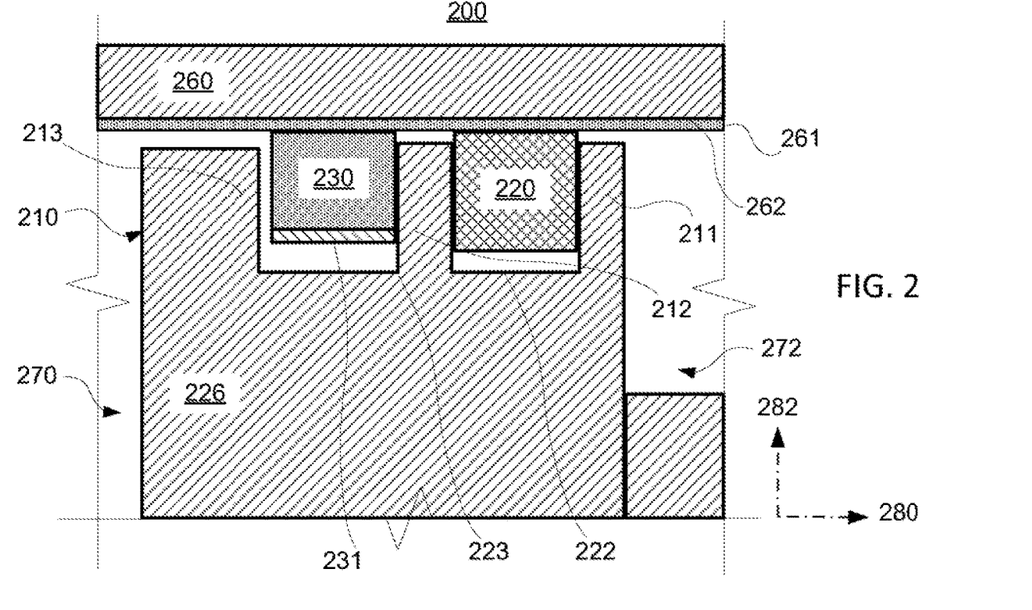
FIG. 2 shows a cross-sectional view of an illustrative piston and cylinder device, including a sealing ringset arranged in multiple grooves, in accordance with some embodiments of the present disclosure.

FIG. 2 shows a cross-sectional view of illustrative piston and cylinder device 200, including a sealing ringset arranged in multiple grooves, in accordance with some embodiments of the present disclosure. Cylinder 260 includes bore 262, which is the inner cylindrical surface in which piston assembly 210 travels (e.g., along axis 280). Piston assembly 210 includes piston 226, which includes grooves 222 and 223, in which respective ring 220 and applicator 230 are configured to be arranged and translate with piston 226. Spring 231 (e.g., which may be ring-shaped) is arranged radially inward of applicator 230 and is configured to apply a radial force (i.e., a preload directed along or against axis 282) on applicator 230 to affect a contact pressure between applicator 230 and bore 262 and layer 261 deposited thereon. Ring 220, applicator 230, and spring 231 constitute an illustrative ringset. The sealing ringset defines high-pressure region 270 and low-pressure region 272. Ring 220 is arranged downstream of applicator 230, in respective groove 222. Applicator 230 is configured to deposit solid lubricant to form, maintain, replenish, or add upon layer 261 (i.e., a solid lubricant layer). Applicator 230, spring 231, or both are configured to engage axially with land 212, land 213, or both of piston 210. Ring 220 is configured to engage (e.g., contact) axially with land 211, land 212, or both of piston 210. In an illustrative example, a spring (e.g., spring 231) may include a cantilever beam spring (e.g., with one end fixed to piston 226 and the other configured to push applicator 230), a coil spring, a disc spring, a wave spring, any other suitable spring, or any combination thereof.

Figure 3:
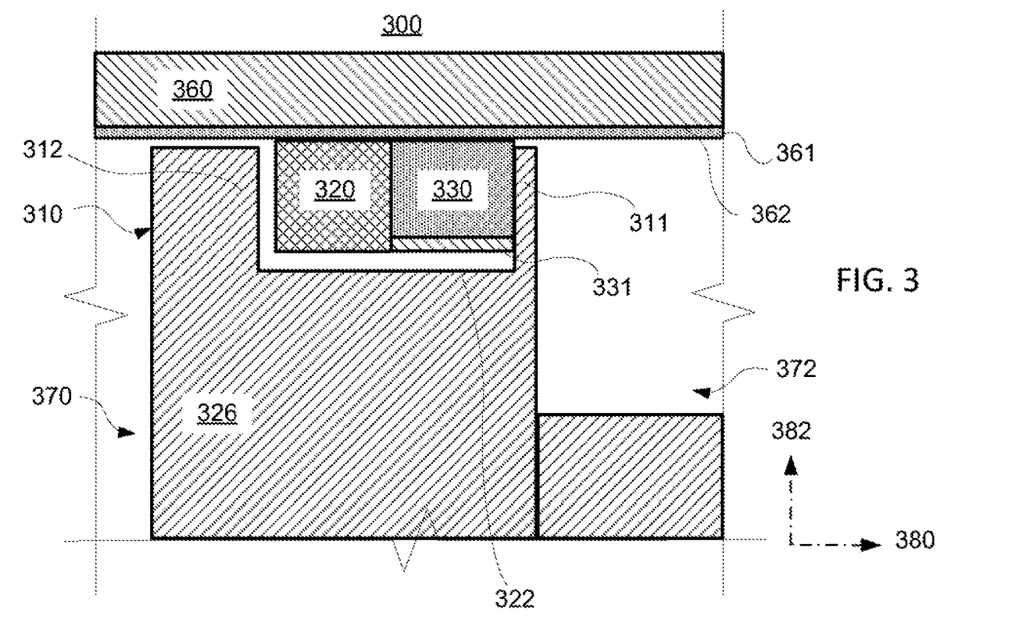
FIG. 3 shows a cross-sectional view of an illustrative piston assembly and cylinder, including a sealing ringset arranged in a single groove, in accordance with some embodiments of the present disclosure.

FIG. 3 shows a cross-sectional view of illustrative piston assembly and cylinder 300, including a sealing ringset arranged in a single groove, in accordance with some embodiments of the present disclosure. Cylinder 360 includes bore 362, which is the inner cylindrical surface in which piston assembly 310 travels (e.g., along axis 380). Piston assembly 310 includes piston 326, which includes groove 322, in which ring 320 and applicator 330 are configured to be arranged and translate with piston 326. Spring 331 (e.g., also termed a radial spring) is arranged radially inward of applicator 330 and is configured to apply a radial outward force (i.e., along axis 382) on applicator 330 to affect a contact pressure between applicator 330 and bore 362 and layer 361 deposited thereon. Ring 320, applicator 330, and spring 331 constitute an illustrative ringset. The sealing ringset defines high-pressure region 370 and low-pressure region 372. Ring 320 is arranged upstream of applicator 330 in groove 322. Applicator 330 is configured to deposit solid lubricant to form, maintain, replenish, or add upon layer 361 (i.e., a solid lubricant layer). In some embodiments, ring 320 is configured to engage applicator 330 at their axial interface in groove 322. Applicator 330, spring 331, or both are configured to engage axially with land 311, land 312, or both of piston 310 (e.g., by applying a contact force).

Figure 4:
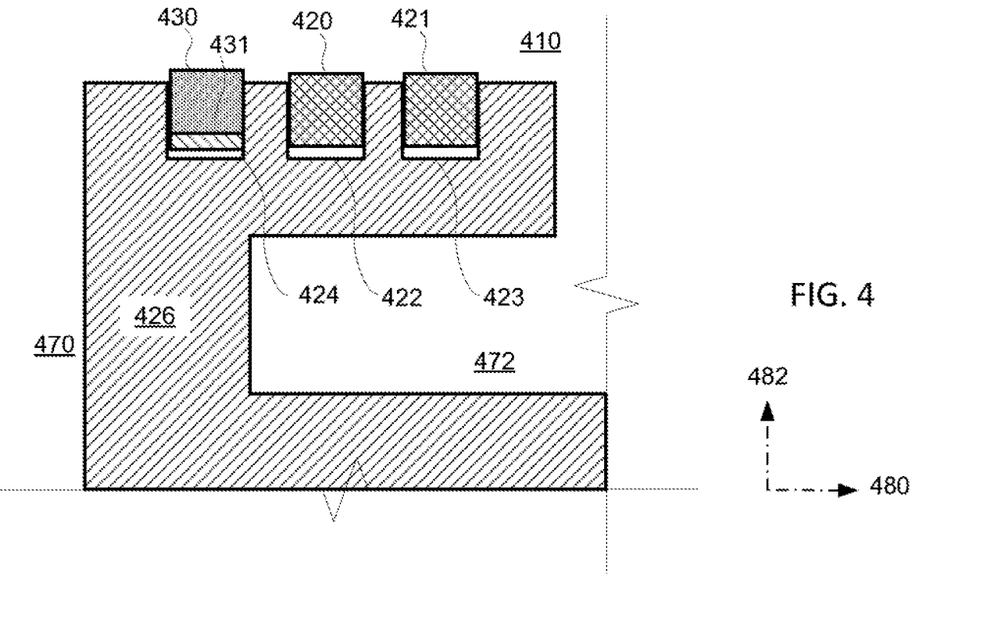
FIG. 4 shows a cross-sectional view of an illustrative piston assembly, including a sealing ringset arranged in three grooves, in accordance with some embodiments of the present disclosure.

FIG. 4 shows a cross-sectional view of illustrative piston assembly 410, including a sealing ringset arranged in three grooves, in accordance with some embodiments of the present disclosure. Piston assembly 410 is configured to travel along axis 480. Piston assembly 410 includes piston 426, which includes grooves 422, 423, and 424, in which respective ring 420, ring 421, and applicator 430 are configured to be arranged respectively and translate with piston 426. Spring 431 is arranged radially inward of applicator 430 and is configured to apply a radial outward force (i.e., along axis 482) on applicator 430 (e.g., to affect a contact pressure between applicator 430 and a bore and/or layer of solid lubricant deposited thereon). Ring 420, ring 421, applicator 430, and spring 431 constitute an illustrative ringset. The sealing ringset defines high-pressure region 470 and low-pressure region 472. Ring 420 is arranged downstream of applicator 430 and in groove 422. Ring 421 is arranged downstream of ring 420 and in groove 424. As shown FIG. 4, while applicator 430 may experience a relatively smaller pressure drop during operation than that across either ring 420 or ring 421, applicator 430 may still be subjected to the conditions of a high-pressure region (e.g., high temperatures and/or pressures).

Figure 5:
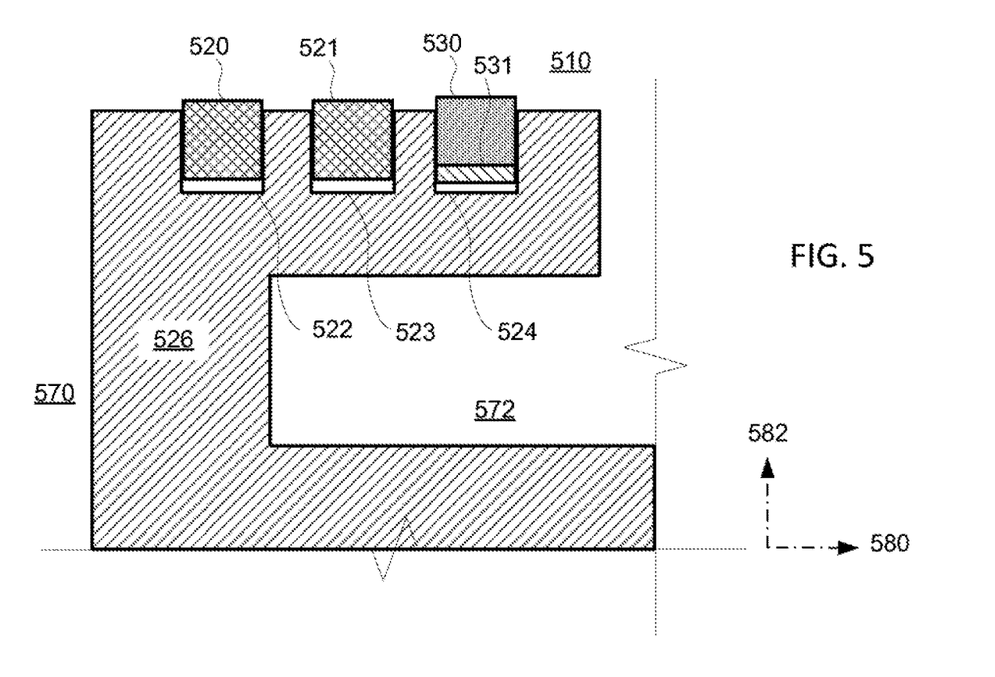
FIG. 5 shows a cross-sectional view of an illustrative piston assembly, including a sealing ringset arranged in three grooves, in accordance with some embodiments of the present disclosure.

FIG. 5 shows a cross-sectional view of illustrative piston assembly 510, including a sealing ringset arranged in three grooves, in accordance with some embodiments of the present disclosure. Piston assembly 510 is configured to travel along axis 580. Piston assembly 510 includes piston 526, which includes grooves 522, 523, and 524, in which respective ring 520, ring 521, and applicator 530 are configured to be arranged respectively and translate with piston 526. Spring 531 is arranged radially inward of applicator 530 and is configured to apply a radial outward force (i.e., along axis 582) on applicator 530 (e.g., to affect a contact pressure between applicator 530 and a bore and/or layer of solid lubricant deposited thereon). Ring 520, ring 521, applicator 430, and spring 531 constitute an illustrative ringset. The sealing ringset defines high-pressure region 570 and low-pressure region 572. Ring 520 is arranged upstream of ring 521 and in groove 522. Ring 521 is arranged upstream of applicator 530 and in groove 523. As shown FIG. 5, applicator 530 may experience a relatively smaller pressure drop during operation than that across either ring 520 or ring 521 and is not subjected to the full conditions of a high-pressure region (e.g., high temperatures and/or pressures) since it is downstream.

Figure 6:
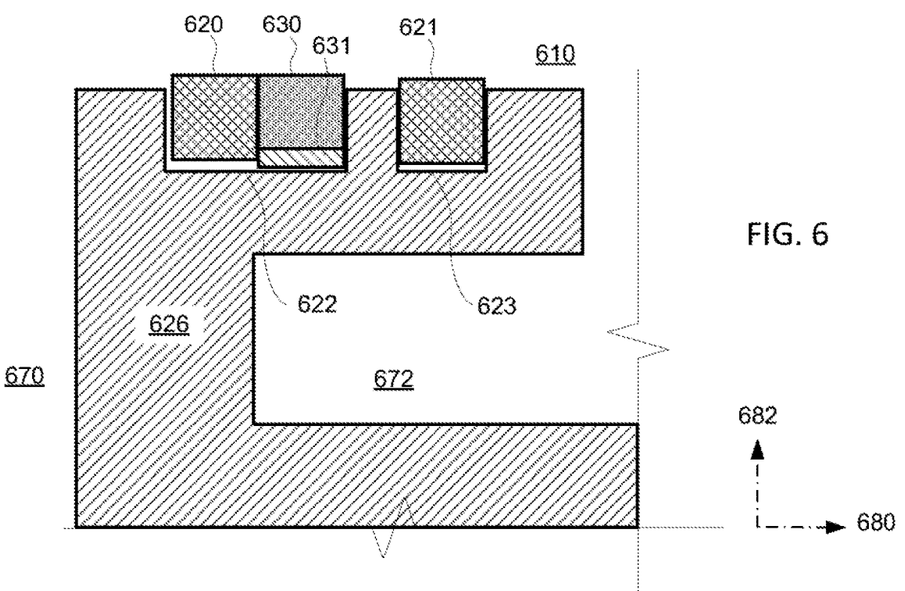
FIG. 6 shows a cross-sectional view of an illustrative piston assembly, including a sealing ringset arranged in two grooves, in accordance with some embodiments of the present disclosure.

FIG. 6 shows a cross-sectional view of illustrative piston assembly 610, including a sealing ringset arranged in two grooves, in accordance with some embodiments of the present disclosure. Piston assembly 610 is configured to travel along axis 680. Piston assembly 610 includes piston 626, which includes grooves 622 and 623, in which ring 620, ring 621, and applicator 630 are configured to be arranged and translate with piston 626. Spring 631 is arranged radially inward of applicator 630 and is configured to apply a radial outward force (i.e., along axis 682) on applicator 630 (e.g., to affect a contact pressure between applicator 630 and a bore and/or layer of solid lubricant deposited thereon). Ring 620, ring 621, applicator 630, and spring 631 constitute an illustrative ringset. The sealing ringset defines high-pressure region 670 and low-pressure region 672. Ring 620 is arranged upstream of applicator 630 and both are arranged in groove 622. Ring 620 and applicator 630 are arranged upstream of ring 621, which is arranged in groove 623. As shown FIG. 6, applicator 630 may experience a relatively smaller pressure drop during operation than that across ring 620 or ring 621 and may be subjected to partially reduced conditions of a high-pressure region (e.g., high temperatures and/or pressures) since it is between rings 620 and 621. For example, applicator 630 may experience a pressure intermediate in value to that of the high-pressure region (i.e., to the left of piston 626 as illustrated) and a low-pressure region (i.e., to the right of piston 626 as illustrated).

Figure 7:
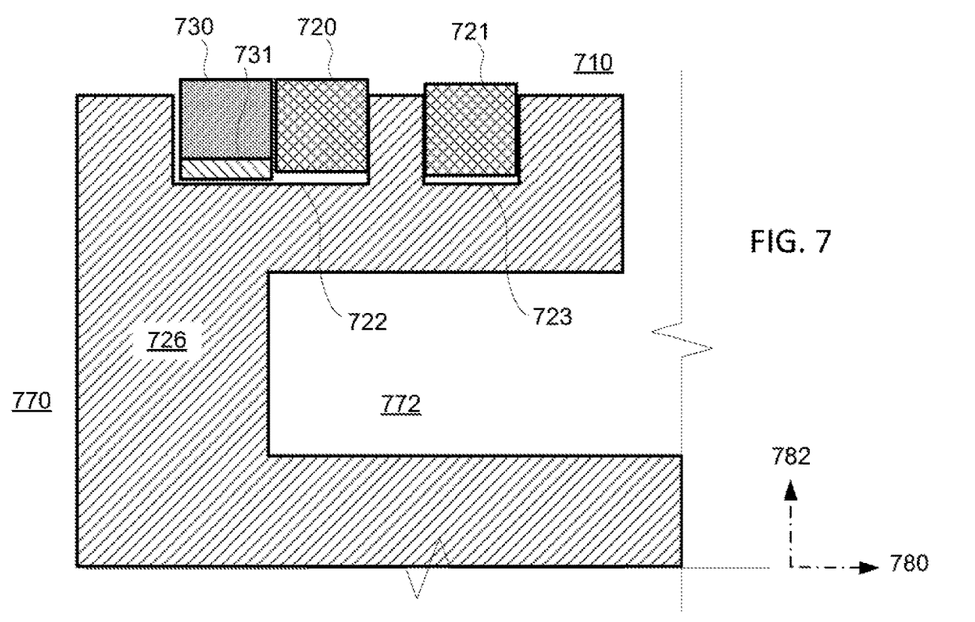
FIG. 7 shows a cross-sectional view of an illustrative piston assembly, including a sealing ringset arranged in two grooves, in accordance with some embodiments of the present disclosure.

FIG. 7 shows a cross-sectional view of illustrative piston assembly 710, including a sealing ringset arranged in two grooves, in accordance with some embodiments of the present disclosure. Piston assembly 710 is configured to travel along axis 780. Piston assembly 710 includes piston 726, which includes grooves 722 and 723, in which ring 720, ring 721, and applicator 730 are configured to be arranged and translate with piston 726. Spring 731 is arranged radially inward of applicator 730 and is configured to apply a radial outward force (i.e., along axis 782) on applicator 730 (e.g., to affect a contact pressure between applicator 730 and a bore and/or layer of solid lubricant deposited thereon). Ring 720, ring 721, applicator 730, and spring 731 constitute an illustrative ringset. The sealing ringset defines high-pressure region 770 and low-pressure region 772. Ring 720 is arranged downstream of applicator 730 and both are arranged in groove 722. Ring 720 and applicator 730 are arranged upstream of ring 721, which is arranged in groove 723. As shown FIG. 7, applicator 730 may experience a relatively smaller pressure drop during operation than that across ring 720 or ring 721 and may be subjected to full conditions of a high-pressure region (e.g., high temperatures and/or pressures) since it is upstream of both rings 720 and 721. For example, applicator 630 may experience (i.e., be exposed to at a surface) a peak pressure and temperature of the high-pressure region. In a further example, in some embodiments, spring 731 need not be included when applicator 730 is forward of both ring 720 and ring 721 (e.g., pressure from high-pressure region 770 may push the applicator radially outward).

Figure 8:
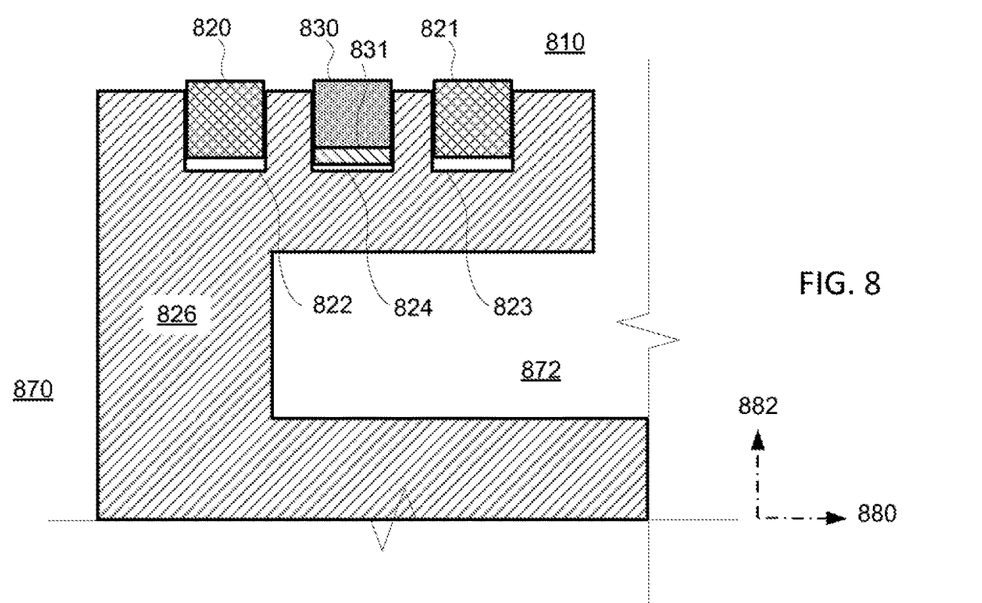
FIG. 8 shows a cross-sectional view of an illustrative piston assembly, including a sealing ringset arranged in three grooves, in accordance with some embodiments of the present disclosure.

FIG. 8 shows a cross-sectional view of an illustrative piston assembly, including a sealing ringset arranged in three grooves, in accordance with some embodiments of the present disclosure. Piston assembly 810 is configured to travel along axis 880. Piston assembly 810 includes piston 826, which includes grooves 822, 823, and 824, in which respective ring 820, ring 821, and applicator 830 are configured to be arranged respectively and translate with piston 826. Spring 831 is arranged radially inward of applicator 830 and is configured to apply a radial outward force (i.e., along axis 882) on applicator 830 (e.g., to affect a contact pressure between applicator 830 and a bore and/or layer of solid lubricant deposited thereon). Ring 820, ring 821, applicator 830, and spring 831 constitute an illustrative ringset. The sealing ringset defines high-pressure region 870 and low-pressure region 872. Ring 820 is arranged upstream of applicator 830 and in groove 822. Ring 821 is arranged downstream of applicator 830 and in groove 823. Applicator 830 and spring 831 are arranged in groove 824 between ring 820 and ring 821. As shown FIG. 8, applicator 830 may experience a relatively smaller pressure drop during operation than that across ring 820 or ring 821 and is subjected to partially reduced conditions of a high-pressure region (e.g., high temperatures and/or pressures) since it is between rings 820 and 821. For example, applicator 830 may experience a pressure intermediate in value to that of the high-pressure region and a low-pressure region.

Figure 9:
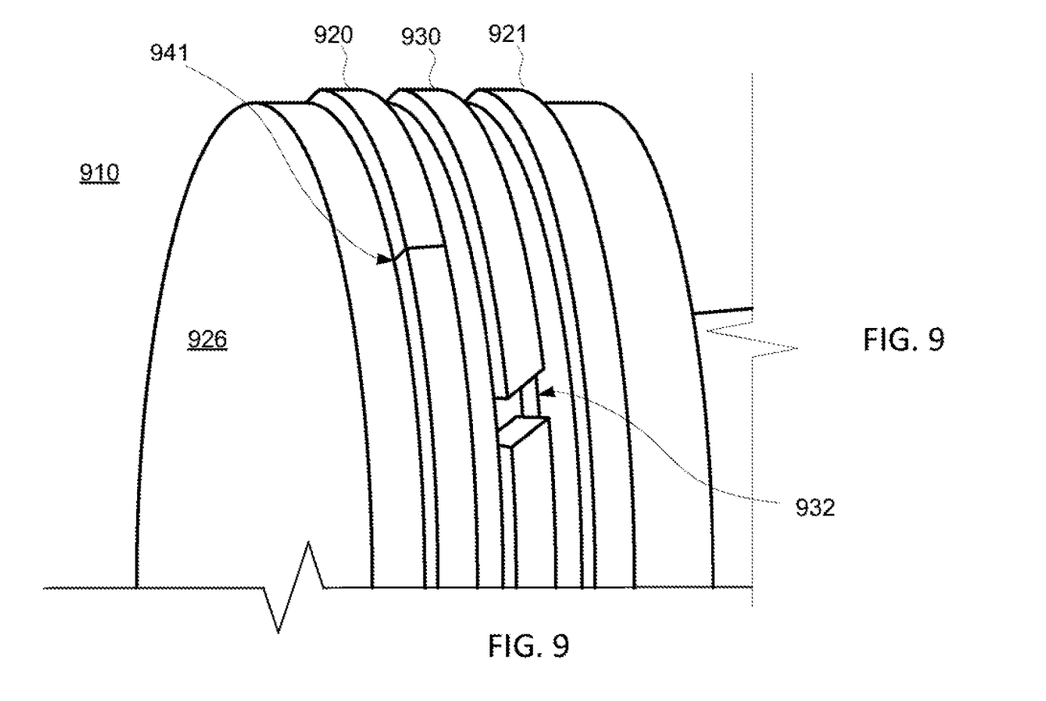
FIG. 9 shows a perspective view of a portion of an illustrative piston assembly, including a sealing ringset arranged in three grooves, in accordance with some embodiments of the present disclosure.

FIG. 9 shows a perspective view of a portion of illustrative piston assembly 910, including a sealing ringset arranged in three grooves, in accordance with some embodiments of the present disclosure. Piston assembly 910 includes piston 926, which includes three grooves into which respective ring 920, applicator 930, and ring 921 are configured to be arranged and translate with piston 926. Ring 920 (e.g., which includes ring split 941), ring 921, and applicator 930 constitute an illustrative ringset. Ring 920 is arranged upstream of applicator 930. Ring 921 is arranged downstream of applicator 930. Applicator 930 is arranged in a groove between ring 920 and ring 921. Gap 932 in applicator 930 may occur, widen, or otherwise persist during wear of applicator 930. Because applicator 930 does not function as a seal, gap 932 need not significantly impact the seal formed by ring 920 and 921. In some embodiments, the gas proximate to applicator 830 during operation is at a higher pressure than a low-pressure region (e.g., rearward of the piston), and there may be a relatively small pressure differential across applicator 130 (e.g., and relatively less loading) as compared to rings 920 and 921. In some embodiments, gap 932 is angled such that no streak forms in the bore where solid lubricant is void. In some embodiments, a second applicator (e.g., or more applicators) may be included, with gaps misaligned to gap 932 (e.g. so that no gaps azimuthally align), to assist in more complete coverage of the solid lubricant on the bore. For example, a second applicator may be included on a piston, with its gap 180 degrees azimuthally from gap 932, such that the gaps are misaligned.

Figure 10:
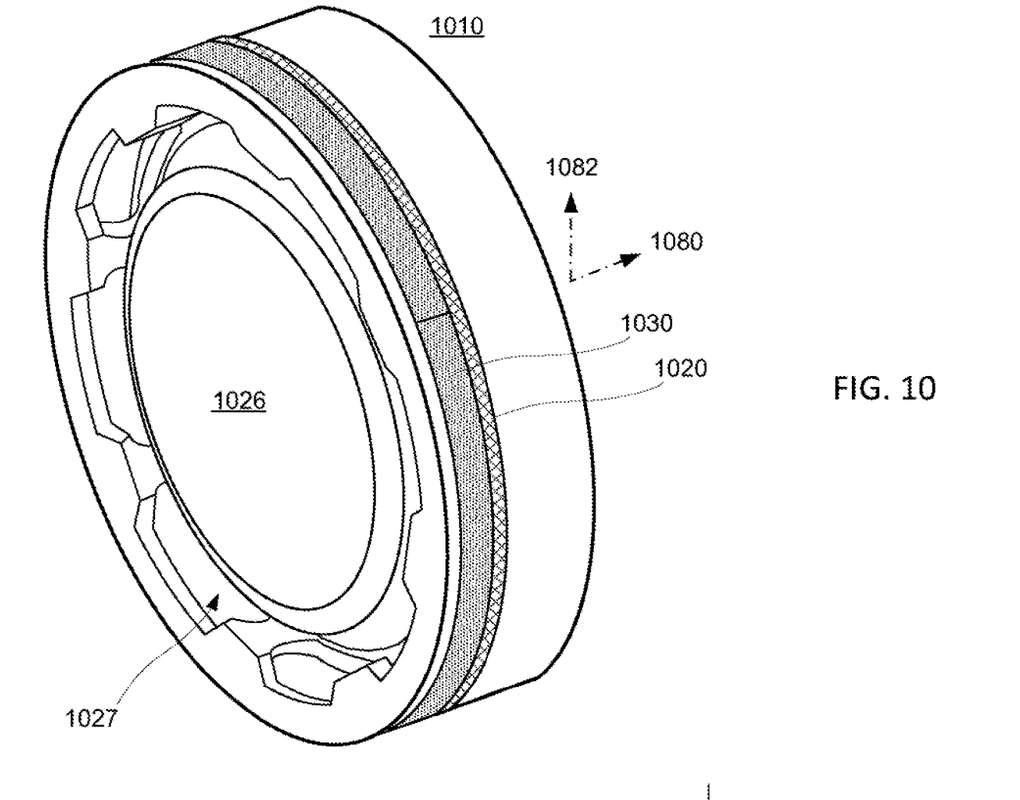
FIG. 10 shows a perspective view of a portion of an illustrative open-face piston assembly, including a sealing ringset, in accordance with some embodiments of the present disclosure.

FIG. 10 shows a perspective view of a portion of illustrative open-face piston assembly 1000, including a sealing ringset, in accordance with some embodiments of the present disclosure. Piston assembly 1000 includes open-face piston 1026 and a sealing ringset. Ring 1020 and applicator 1030 constitute the ringset of FIG. 10. Open-face piston 1026 includes opening 1027, which opens to a radially inner face of the ringset and fluid couples the radially inner face to a high-pressure region.

Figure 11:
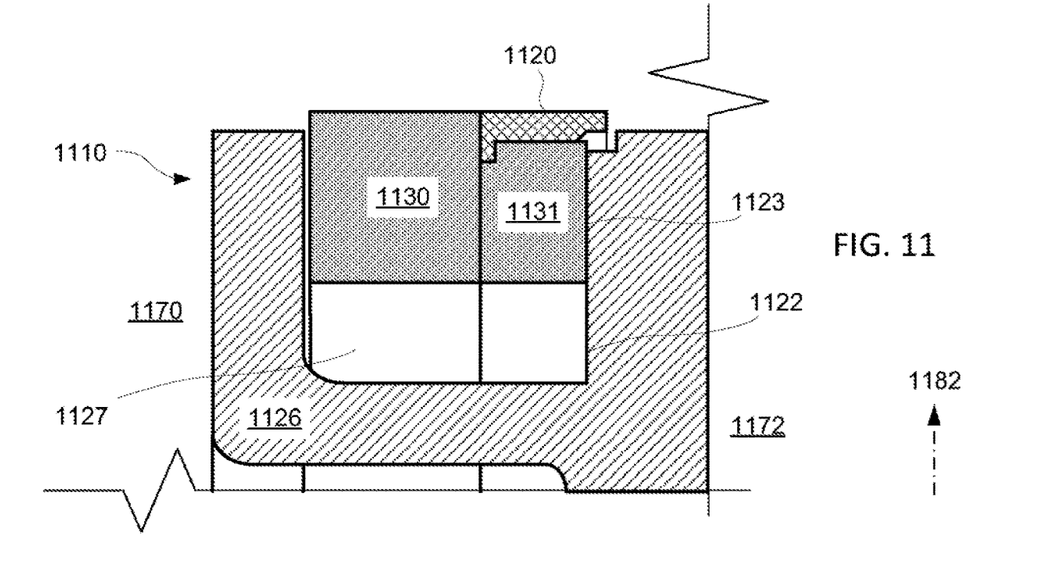
FIG. 11 shows a cross-sectional view of an illustrative open-face piston assembly, including a sealing ringset arranged in a single groove, in accordance with some embodiments of the present disclosure.

FIG. 11 shows a cross-sectional view of illustrative open-face piston assembly 1110, including a sealing ringset arranged in a single groove, in accordance with some embodiments of the present disclosure. Piston assembly 1110 may be similar to piston assembly 1000 of FIG. 10, for example. Piston assembly 1100 includes open-face piston 1126 and a sealing ringset. Ring 1120, ring 1131, and applicator 1130 constitute the ringset of FIG. 11. The sealing ringset defines high-pressure region 1170 and low-pressure region 1172.

Applicator 1130 is arranged in groove 1122 such that it is free to move independently from the ring 1120, and thus can wear at a different rate from the metal seal. In some embodiments, gas pressure on the inner surface of applicator 1130 (e.g., in region 1127 which is open to high-pressure region 1170), during operation, pushes applicator 1130 radially outward against a bore (e.g., similar to a spring ring), causing solid lubricating material to be transferred from applicator 1130 to the bore. Ring 1120 is thus lubricated against the bore by the deposited film from applicator 1130. In some embodiments, region 1127 need not be appreciably open to high-pressure region 1170 for a radially outward pressure force to push applicator 1130 radially outwards. In some embodiments, ring 1120 is configured to seal against land 1123 (i.e., the downstream face of groove 1122). As piston 1126 and ring 1120 move relative to each other, rubbing wear and friction may occur between the ring 1120 and groove 1122 (which includes land 1123). For example, without liquid lubricant (e.g., oil) present at this interface to reduce friction, galling could occur. To avoid galling and/or high friction between ring 1120 and groove 1122, ring 1131 may be included in the interface between ring 1120 and groove 1122. FIG. 11 illustrates ring 1131 arranged at the radially inner surface of ring 1120. In some embodiments, ring 1131 may be arranged axially downstream of ring 1120. In some embodiments, ring 1131 may be arranged in any suitable configuration relative to ring 1120 such that it provides an intermediate sliding interface with desired wear properties between ring 1120 and groove 1122.

Figure 12:
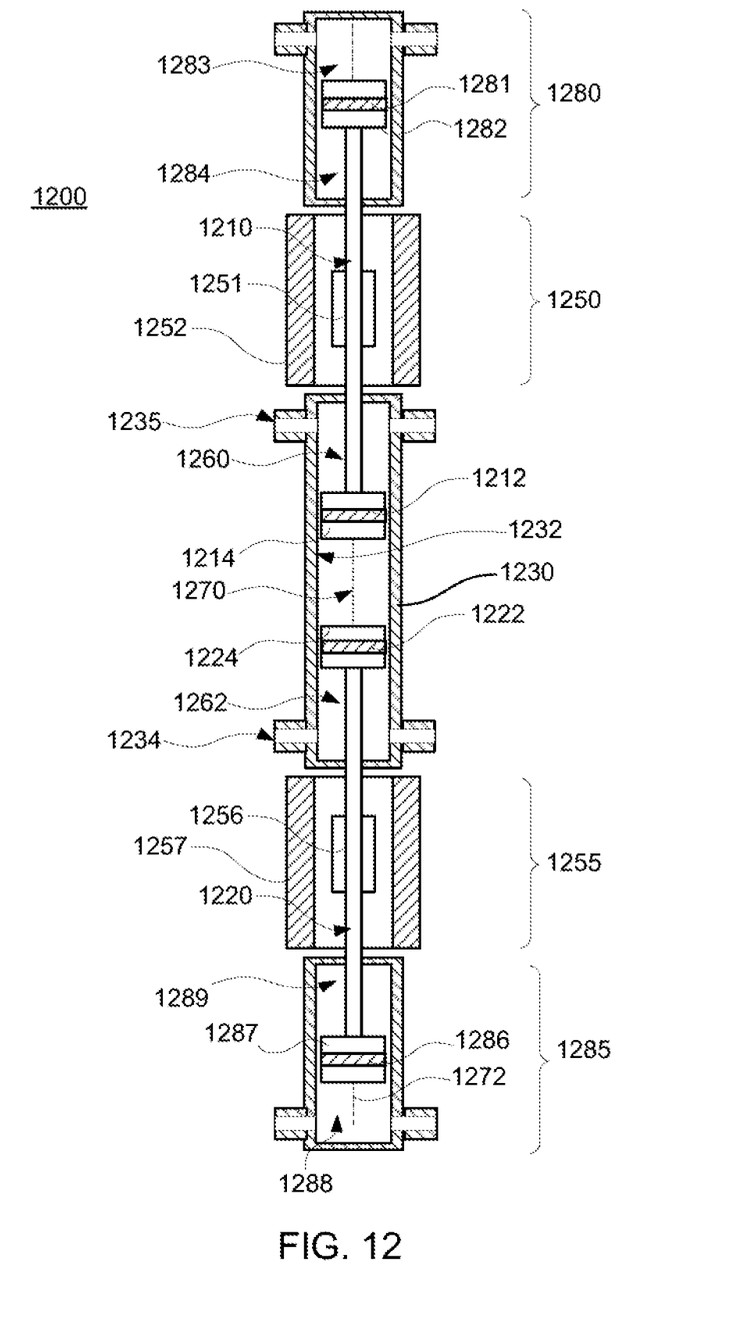
FIG. 12 shows a cross-sectional view of an illustrative device including two free piston assemblies that include respective sealing ringsets, in accordance with some embodiments of the present disclosure.

FIG. 12 shows a cross-sectional view of illustrative device 1200 including two free piston assemblies 1210 and 1220 that include respective sealing ringsets 1212 and 1222, in accordance with some embodiments of the present disclosure. In some embodiments, device 1200 may include linear electromagnetic machines 1250 and 1255 to convert between kinetic energy of respective free piston assemblies 1210 and 1220 and electrical energy. In some embodiments, device 1200 may include gas regions 1260 and 1262, which may, for example, be at a relatively lower pressure than gas region 1270 (e.g., a high-pressure region) for at least some, if not most, of a cycle (e.g., an engine cycle, or an air compression cycle). For example, gas regions 1260 and 1262 (e.g., low pressure regions) may be open to respective breathing ducting (e.g., an intake manifold, an intake system, an exhaust manifold, an exhaust system). To illustrate, breathing ports 1234 and 1235 are configured to provide reactants to, and remove exhaust from, bore 1232 of cylinder 1230. In a further example, gas regions 1260 and 1262 may be vented to atmosphere (e.g., be at about 1.01 bar absolute pressure). In some embodiments, device 1200 may include gas springs 1280 and 1285, which may be used to store and release energy during a cycle in the form of compressed gas (e.g., a driver section). For example, free piston assemblies 1210 and 1220 may each include respective pistons 1282 and 1287, having grooves for respective sealing ring assemblies 1281 and 1286, to seal respective gas regions 1283 and 1288 (e.g., high-pressure regions) from respective gas regions 1284 and 1289 (e.g., low-pressure regions).

Cylinder 1230 may include bore 1232, centered about axis 1272. In some embodiments, free piston assemblies 1210 and 1220 may translate along axis 1272, within bore 1232, allowing gas region 1270 to compress and expand. For example, gas region 1270 may be at relatively high pressure as compared to gas region 1260 for at least some of a stroke of free piston assemblies 1210 and 1220 (e.g., which may translate along axis 1272 in opposed piston synchronization). Sealing ringsets 1212 and 1222 may seal gas region 1270 from respective gas regions 1260 and 1262 within bore 1232. In some embodiments, free piston assemblies 1210 and 1220 may include respective pistons 1214 and 1224, and respective sealing ringsets 1212 and 1222 which may be arranged in respective corresponding grooves of pistons 1214 and 1224. It will be understood that gas regions 1260 and 1262, and gas region 1270, may change volume as free piston assemblies 1210 and 1220 move or are otherwise positioned at different locations along axis 1272. The portions of respective sealing ringsets 1212 and 1222 nearest gas region 1270 are each termed the front, and the portion of sealing ringsets 1212 and 1222 nearest respective gas regions 1260 and 1262 are each termed the rear. Sealing ringsets 1212 and 1222 may each include a high-pressure boundary, which may each depend on a pressure in gas region 1270. For example, a high-pressure boundary of sealing ringset 1212 may be open to gas region 1270 (e.g., coupled by one or more orifices, or other opening), and have a corresponding pressure the same as (e.g., if gas from gas region 1270 is unthrottled in the sealing ring assembly), or less than (e.g., if gas from gas region 1270 is throttled in the sealing ring assembly), the pressure of gas region 1270. Sealing ringsets 1212 and 1222 may each include a low-pressure boundary, which may depend on a gas pressure in respective gas regions 1260 and 1262. For example, a low-pressure boundary of sealing ringset 1212 may be open to gas region 1260 and have a corresponding pressure about the same as the pressure of gas region 1260.

In some embodiments, pistons 1214 and 1224 may each include one or more grooves into which one or more respective sealing ringsets may be arranged. For example, as shown in FIG. 12, pistons 1214 and 524 may each include one groove, into which sealing ringset 1212 and sealing ringset 1222 may be installed, respectively. In a further example, although not shown in FIG. 5, piston 1214 may include two grooves, in which two respective components of sealing ringset 1212 may be installed. In a further example, piston 1214 may include two grooves configured for a respective ring and applicator (not shown). A sealing ringset may be used to seal any suitable high pressure and low-pressure regions from each other. For example, sealing ringset 1286 is configured to seal high-pressure region 1288 (e.g., a gas spring) from low-pressure region 1289. In a further example, sealing ringset 1281 is configured to seal high-pressure region 1283 (e.g., a gas spring) from low-pressure region 1284.

In some embodiments, free piston assemblies 1210 and 1220 may include respective magnet sections 1251 and 1256, which interact with respective stators 1252 and 1257 to form respective linear electromagnetic machines 1250 and 1255. For example, as free piston assembly 1210 translates along axis 1272 (e.g., during a stroke of an engine cycle), magnet section 1251 may induce current in windings of stator 1252. Further, current may be supplied to respective phase windings of stator 1252 to generate an electromagnetic force on free piston assembly 1210 (e.g., to effect motion of free piston assembly 1210).

In some embodiments, pistons 1214 and 1224, sealing ringsets 1212 and 1222, and cylinder 1230 may be considered a piston and cylinder assembly. In some embodiments, device 1200 may be an engine, an air compressor, any other suitable device having a piston and cylinder assembly, or any combination thereof. In some embodiments, device 1200 need not include two free piston assemblies. For example, cylinder 1230 could be closed (e.g., with a cylinder head), and free piston assembly 1210 alone may translate along axis 1272.

It will be understood that the present disclosure is not limited to the embodiments described herein and can be implemented in the context of any suitable system. In some suitable embodiments, the present disclosure is applicable to reciprocating engines and compressors. In some embodiments, the present disclosure is applicable to free-piston engines and compressors. In some embodiments, the present disclosure is applicable to combustion and reaction devices such as a reciprocating engine and a free-piston engine. In some embodiments, the present disclosure is applicable to non-combustion and non-reaction devices such as reciprocating compressors, free-piston heat engines, and free-piston compressors. In some embodiments, the present disclosure is applicable to gas springs. In some embodiments, the present disclosure is applicable to oil-free reciprocating and free-piston engines and compressors. In some embodiments, the present disclosure is applicable to oil-free free-piston engines with internal or external combustion or reactions. In some embodiments, the present disclosure is applicable to oil-free free-piston engines that operate with compression ignition, chemical ignition (e.g., exposure to a catalytic surface, hypergolic ignition), plasma ignition (e.g., spark ignition), thermal ignition, any other suitable energy source for ignition, or any combination thereof. In some embodiments, the present disclosure is applicable to oil-free free-piston engines that operate with gaseous fuels, liquid fuels, or both. In some embodiments, the present disclosure is applicable to linear free-piston engines. In some embodiments, the present disclosure is applicable to engines that can be combustion engines with internal combustion/reaction or any type of heat engine with external heat addition (e.g., from a heat source such as waste heat or an external reaction such as combustion).

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A sealing ringset configured to seal against a bore of a cylinder without liquid lubricant, the sealing ringset comprising:
   at least one sealing ring comprising metal configured to be arranged on a piston to seal against the bore;
   a second sealing ring comprising a solid lubricant that is configured to prevent the at least one sealing ring from contacting a circumferential groove of the piston; and
   an applicator comprising a solid lubricant configured to be arranged on the piston and to provide lubrication between the at least one sealing ring and the bore.

2. The sealing ringset of claim 1, wherein the at least one sealing ring and the applicator are configured to be arranged together in a circumferential groove of the piston.

3. The sealing ringset of claim 1, wherein the at least one sealing ring and the applicator are configured to be arranged in respective circumferential grooves of the piston.

4. The sealing ringset of claim 1, wherein the at least one sealing ring is axially rearward of the applicator.

5. The sealing ringset of claim 1, wherein the at least one sealing ring is axially forward of the applicator.

6. The sealing ringset of claim 1, wherein the applicator is not configured to act as a seal.

7. The sealing ringset of claim 1, wherein the applicator comprises an oxidation inhibitor.

8. The sealing ringset of claim 1, wherein the applicator is configured to provide the lubrication between the at least one sealing ring and the bore by depositing a layer of the solid lubricant on the bore.

9. The sealing ringset of claim 1, further comprising a spring arranged radially inwards of the applicator and configured to apply a radially outward force on the applicator.

10. A piston assembly comprising:
    a piston comprising at least one circumferential groove; and
    a sealing ringset comprising:
       at least one sealing ring comprising metal configured to be arranged in the at least one circumferential groove and configured to seal against a bore without liquid lubricant,
       a second sealing ring comprising a solid lubricant that is configured to prevent the at least one sealing ring from contacting the at least one circumferential groove, and
       an applicator comprising a solid lubricant configured to be arranged in the at least one circumferential groove and configured to provide lubrication between the at least one sealing ring and the bore.

11. The piston assembly of claim 10, wherein the at least one circumferential groove consists of a single groove, and wherein the at least one sealing ring and the applicator are configured to be arranged together in the single groove.

12. The piston assembly of claim 10, wherein the at least one circumferential groove comprises at least two grooves, and wherein the at least one sealing ring and the applicator are configured to be arranged in respective circumferential grooves of the piston.

13. The piston assembly of claim 10, wherein the at least one sealing ring is axially rearward of the applicator.

14. The piston assembly of claim 10, wherein the at least one sealing ring is axially forward of the applicator.

15. The piston assembly of claim 10, wherein the applicator is not configured to act as a seal.

16. The piston assembly of claim 10, wherein the applicator comprises an oxidation inhibitor.

17. The piston assembly of claim 10, wherein the applicator is configured to provide the lubrication between the at least one sealing ring and the bore by depositing a layer of the solid lubricant on the bore.

18. The piston assembly of claim 10, wherein the sealing ringset further comprises a spring arranged radially inwards of the applicator and configured to apply a radially outward force on the applicator.

19. A device comprising:
a cylinder comprising a bore;
a piston comprising at least one circumferential groove and configured to move axially within the bore; and
a sealing ringset comprising:
at least one sealing ring comprising metal configured to be arranged in the at least one circumferential groove and configured to seal against the bore without liquid lubricant,
a second sealing ring comprising a solid lubricant that is configured to prevent the at least one sealing ring from contacting the at least one circumferential groove, and
an applicator comprising a solid lubricant configured to be arranged in the at least one circumferential groove and configured to provide lubrication between the at least one sealing ring and the bore.

20. The device of claim 19, wherein the at least one circumferential groove consists of a single groove, and wherein the at least one sealing ring and the applicator are configured to be arranged together in the single groove.

21. The device of claim 19, wherein at least one circumferential groove comprises at least two grooves, and wherein the at least one sealing ring and the applicator are configured to be arranged in respective circumferential grooves of the piston.

22. The device of claim 19, wherein the at least one sealing ring is axially rearward of the applicator.

23. The device of claim 19, wherein the at least one sealing ring is axially forward of the applicator.

24. The device of claim 19, wherein the applicator is not configured to act as a seal.

25. The device of claim 19, wherein the applicator comprises an oxidation inhibitor.

26. The device of claim 19, wherein the applicator is configured to provide the lubrication between the at least one sealing ring and the bore by depositing a layer of the solid lubricant on the bore.

27. The device of claim 19, wherein the sealing ringset further comprises a spring arranged radially inwards of the applicator and configured to apply a radially outward force on the applicator.

* * * * *